(12) United States Patent
Stremilova et al.

(10) Patent No.: US 7,465,691 B1
(45) Date of Patent: Dec. 16, 2008

(54) COMPOSITION FOR CLEANING UP NATURAL WATER AND SEWAGE WATER AND METHOD FOR PRODUCING SAID COMPOSITION (VARIANTS)

(76) Inventors: Nina Nikolaevna Stremilova, 26 Korpusnaya ul. App. #8, St. Petersburg (RU) 197110; Serguei Vladimirovich Stremilov, 601 Finch Avenue West, Apt. 909, North York, Ontario (CA) M2R 1N9

( * ) Notice: Subject to any disclaimer, the term of this patent is extended or adjusted under 35 U.S.C. 154(b) by 940 days.

(21) Appl. No.: 10/311,870

(22) PCT Filed: Sep. 25, 2000

(86) PCT No.: PCT/RU00/00391

§ 371 (c)(1),
(2), (4) Date: Dec. 20, 2002

(87) PCT Pub. No.: WO01/98215

PCT Pub. Date: Dec. 27, 2001

(30) Foreign Application Priority Data

Jun. 22, 2000 (RU) ............................. 2000115983

(51) Int. Cl.
*B01J 23/00* (2006.01)
*B01J 21/00* (2006.01)
*B01J 31/00* (2006.01)
*B01J 37/00* (2006.01)
*C08F 4/00* (2006.01)

(52) U.S. Cl. ..................... 502/350; 502/104; 502/242; 502/351

(58) Field of Classification Search ................ 502/309, 502/350, 351, 104, 242; 252/301.4 F
See application file for complete search history.

(56) References Cited

U.S. PATENT DOCUMENTS

| | | | | |
|---|---|---|---|---|
| 4,010,238 | A | * | 3/1977 | Shiraishi et al. ........... 423/239.1 |
| 4,156,040 | A | | 5/1979 | Swider et al. |
| 4,215,094 | A | | 7/1980 | Inao et al. |
| 4,389,337 | A | * | 6/1983 | Eastman ..................... 502/303 |
| RE31,364 | E | * | 8/1983 | Wise .......................... 502/350 |
| 4,482,646 | A | * | 11/1984 | Eastman et al. ............ 502/324 |
| 4,566,986 | A | | 1/1986 | Waldmann |
| 4,731,351 | A | * | 3/1988 | Kimble ....................... 502/349 |
| 4,783,265 | A | | 11/1988 | Timmons |
| 4,849,392 | A | * | 7/1989 | Hums et al. ................ 502/209 |
| 5,006,506 | A | * | 4/1991 | Hsieh et al. ................ 502/204 |
| 5,059,576 | A | * | 10/1991 | Kato et al. .................. 502/309 |
| 5,096,868 | A | * | 3/1992 | Hsieh et al. ................ 502/107 |
| 5,374,599 | A | * | 12/1994 | Ishii et al. .................. 502/326 |
| 5,510,309 | A | * | 4/1996 | Chang et al. ............... 502/308 |
| 5,872,072 | A | * | 2/1999 | Mouri et al. ............... 502/208 |
| 5,902,873 | A | * | 5/1999 | Banach et al. ............. 528/279 |
| 5,976,401 | A | | 11/1999 | Suzuki et al. |
| 6,043,335 | A | * | 3/2000 | Banach et al. ............. 528/279 |
| 6,077,492 | A | * | 6/2000 | Anpo et al. ................ 423/239.1 |
| 6,123,854 | A | | 9/2000 | Iwane et al. |
| 6,235,677 | B1 | * | 5/2001 | Manzer et al. ............. 502/232 |
| 6,420,437 | B1 | * | 7/2002 | Mori et al. ................. 516/90 |
| 2006/0243943 | A1 | * | 11/2006 | Ohmori et al. ............ 252/62.9 R |

FOREIGN PATENT DOCUMENTS

| | | |
|---|---|---|
| FR | 2787039 | 12/1998 |
| GB | 1484671 | 11/1973 |
| JP | 8266602 | 3/1995 |
| RU | 2087425 | 5/1993 |
| RU | 93031275 | 6/1993 |
| RU | 2088527 | 4/1995 |
| RU | 95106759 | 4/1995 |
| RU | 2039711 | 7/1995 |
| RU | 2122975 | 3/1997 |
| RU | 97119967 | 11/1997 |

OTHER PUBLICATIONS

Tkachev K. V., et al. "Technology of Coagulants", Leningrad, Khimiya, 1978, pp. 8-32.
English translation of pp. 9-12 of Tkachev K. V., et al., "Technology of Coagulants", Leningrad, Khimiya, 1978.
Zapolsky A. K. and Baran A. A., "Coagulants and Flocculants in a Water Treatment Processes", Leningrad, Khimiya, 1987, pp. 10-105.
English translation of pp. 27-28, 36, 42-43, 67, 79, 85, 96, and 101 of Zapolsky A. K. and Baran A. A., "Coagulants and Flocculants in a Water Treatment Processes", Leningrad, Khimiya, 1987.
Babenkov E. D., "The Water Cleaning by Coagulants", Moscow, Nauka, 1977, p. 108.
English translation of most relevant paragraph of Babenkov E. D., "The Water Cleaning by Coagulants", Moscow, Nauka, 1977, p. 108.
"Environmental Health Criteria 24, Titanium", World Health Organization, Geneva, 1982.
The Ministry of Public Health Services of Russian Federation Fishery Committee, "The List of Maximum Permissible Concentration (PDK) and General Safe Level Nuisance Value (OBUV) of Harmful Substances for Fishing Reservoirs", Moscow, Medinf, 1995.
English translation of The Ministry of Public Health Services of Russian Federation Fishery Committee, "The List of Maximum Permissible Concentration (PDK) and General Safe Level Nuisance Value (OBUV) of Harmful Substances for Fishing Reservoirs", Moscow, Medinf, 1995.

(Continued)

*Primary Examiner*—Cam N. Nguyen

(57) ABSTRACT

The invention relates to a process of preparing a composition for natural and waste waters purification, by heating and stirring and acid titanium-containing solution with metal compounds selected from the group consisting of Group I-Group V and Group VIII of the periodic table of elements by heat treating said compounds with titanium solutions in at least two heating steps and introducing additional compounds (trivalent titanium compounds and metal oxides).

4 Claims, No Drawings

OTHER PUBLICATIONS

Kulsky L. A., "Theoretical Substantiation of Water Clearing Technology", Kiev, Naukova Dumka, 1968, pp. 72-89.

English translation of Kulsky L. A., "Theoretical Substantiation of Water Clearing Technology", Kiev, Naukova Dumka, 1968, pp. 72-89.

Frog N. P., "Information Base for Selection of Technological Process of Drinking Water Treatment/Water Supply and Sanitary Engineering", No. 4, 1998, p. 8.

English translation of Frog N. P., "Information Base for Selection of Technological Process of Drinking Water Treatment/Water Supply and Sanitary Engineering", No. 4, 1998.

Gorostchenko Ya. G., Academy of Sciences Ukrainian SSR, "Chemistry of Titanium", Kiev, Naukova dumka, 1970, p. 258.

English translation of most relevant paragraph of Gorostchenko Ya. G., Academy of Sciences Ukrainian SSR, "Chemistry of Titanium", Kiev, Naukova dumka, 1970, p. 258.

English translation of Abstract from JP8266602, Mar. 30, 1995, "Manufacture of Material for Removing Harmful Matter Containing Titanium Oxide".

English tranlation of Abstract from RU2,039,711, Jul. 20, 1995, "Method for Production of Coagulant".

English translation of Abstract from RU93031275, Jun. 10, 1993, "Method of Preparing Coagulating Agent of the Basis of Aluminium Mixed Based Salts".

English translation of Abstract from RU95106759, Apr. 26, 1995, "Method of Aluminosilicate Coagulant Producing".

English translation of Abstract from RU2,088,527, Apr. 26, 1995, "Method of Aluminosilicate Coagulant Producing".

English translation of Abstract from RU97119967, Nov. 21, 1997, "Method of Production of Basic Aluminium Chloride".

English translation of Abstract from RU2,122,975, Mar. 14, 1997, "Method of Preparing Coagulant".

English translation of Abstract from RU2,087,425, May 8, 1993, "The Method of Manufacturing a Reagent for Water Treatment".

English translation of Abstract from 2,787,039, Dec. 11, 1998, "Dispersion of Mineral Particles Stabilised by Aluminium Complexes".

\* cited by examiner

COMPOSITION FOR CLEANING UP NATURAL WATER AND SEWAGE WATER AND METHOD FOR PRODUCING SAID COMPOSITION (VARIANTS)

FIELD OF THE ART

The invention relates to ecology and, more specifically, it relates to purification of natural and waste waters from different toxic compounds of natural and technological origin The invention can be used to protect the environment and human health.

The problem of water treatment is important because man-made burden on the environment, especially in economically developed countries, is increasing and because natural water is increasingly polluted with organic and non-organic ecotoxicants: heavy metals, radionuclides, mineral and organic suspensions, microbes, phytoplankton and zooplankton. Purification of natural and waste waters from organic substances is especially important for drinking water supply and for water supply of a number of high-technology industries. Ineffective treatment and formation of secondary impurities, harmful to human health, in the process of water treatment result in undesirable ecological consequences and upset complicated technological processes.

PRIOR ART

There are methods of water purification based on traditional reagents [1, 2] which consist of di- and trivalent metals Unfortunately, due to their low coagulation and sorption ability they can not provide the required degree of purification, they poorly coagulate at low temperatures of treated water.

There are complicated compositions which contain compounds of uni-, di- and trivalent metals [3,4] and they are not very good for water treatment either, especially for purification from organic impurities It is known from the current state of the art [5] that the higher is the valence of a metal to be used in the composition the higher is its coagulation ability and hence the efficiency of the purification process. Therefore if tetravalent metals are included in these compositions the processes of coagulation and water treatment must become more effective.

There is a composition containing compounds of tetravalent titanium. its oxide, hydroxide, meta- and orthotitanic acids [6] In the course of water purification the composition is treated with ultraviolet irradiation and neutralized with sodium hydroxide. Unfortunately this composition, which is prepared by means of a prior art method, is not effective enough because it is not stable in terms of time, requires preliminary treatment with ultraviolet irradiation and its application is limited (paper production)

There is a composition [7] that contains water-soluble salts of titanium and iron or zirconium or aluminum, the ratio between titanium and other metal (calculated as $TiO_2$ and $Fe_2O_3$ or $Zr_2$ and $Al_2O_3$) being in the range of 1:1 to 40:1 by weight. The disadvantage of this composition is high content of titanium that is technically and economically inexpedient because result in large sediment amount and raise the price of water purification.

The drawbacks of the composition are its serious limitation in terms of makeup and quantities of the compounds, which depend on the available aluminum production wastes. Its principal drawback is that it can not be used for drinking water production because the raw material contains a few harmful impurities (vanadium, cadmium and others).

The versions of the claimed composition are free from these shortcomings.

From the state of the art we know that there are a few processes of preparing compositions for natural and waste waters treatment on the basis of aluminum, iron and silicon compounds. [1, 5]. The compositions are prepared by treating raw materials containing aluminum, iron and silicon with different acids or mixtures of acids and heating them simultaneously [8-15].

There is a process of preparing a composition for water treatment [16] which is the most similar to the claimed invention and is chosen as a prototype by the applicants. The process [16] is based on treating hydroxides of metals from groups II, III and IV of the periodic table (pt) with a titanium-containing acid solution with continuous stirring and heating it over 60° C.

The drawback of the process is the limited selection of di-, tri- and tetravalent (titanium included) elements of the composition, which reduces the coagulation ability of the composition and hence the efficiency of water treatment. The process does not have the polymerization phase, which also reduces the quality of the reagent and that of the coagulation process. Besides that the ratio of the composition elements in this process makes it less efficient for the concrete water sources and waste waters and is often uneconomical because of high content of titanium.

DISCLOSURE OF THE INVENTION

The technical result provided by the versions of the claimed invention is high degree of purification of both natural water and industrial waste waters from heavy metals, radionuclides and organic substances. When the claimed composition is used for drinking water supply it does not cause secondary pollution and even relatively small doses of coagulant ensure its reliable and stable work. What is especially important in terms of ecology is that a small amount of chemical sludge, formed here, can easily be utilized and is not harmful to the environment.

All the claimed versions of the composition have the same technical result if a selected composition is optimal in terms of the type of water to be purified, the temperature of water treatment and the process of the composition preparation, a high degree of purification can always be ensured with minimum consumption of reagents. Moreover, the composition based on titanium compounds is ecologically safer than the prior art reagents [17, 18] because its application reduces the level of secondary pollution in the purified water, the titanium compounds formed during coagulation being practically insoluble in water Numerous studies have demonstrated that if the makeup of the composition is changed according to the certain conditions of the water source to be purified purification can be carried out most effectively and with minimum consumption of reagents.

This approach is not only economically efficient but it also minimizes the level of secondary pollution with the compounds of the composition itself in the purified water, which is very important in terms of ecology The above-mentioned technical result of the embodiment of the invention (the first version) is provided by introducing the compounds of niobium and/or tantalum from group V, lithium, potassium and/or rubidium from group I, calcium and/or zinc from group II, lanthanum and/or scandium from group III, zirconium and/or tin from group IV and nickel from group VIII into the composition for natural water and waste waters purification, which includes titanium compounds and those of some metals from groups I-IV and VII of the pt.

The composition for natural water and waste waters treatment includes compounds of titanium and those of the metals from groups I-VIII of the pt and can be described by the following ion formula:

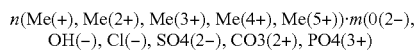

where:
- Me(+)=Li, K, Na, Rb (Group I of the pt)
- Me(2+)=Mg, Ca, Zn, Fe(2+), Ni(2+) (groups II and VIII of the pt)
- Me(3+)=Al, Sc, La, Fe(3+), Ti(3+) (groups III, IV and VIII of the pt)
- Me(4+)=Si, Ti, Zr, Sn (group IV of the pt)
- Me(5+)=Nb, Ta (group V of the pt)

The compounds of titanium and those of metals from all the groups of the pt are taken with the ratio between titanium ions and those of metals in the range of 1:(0,1-30).

In the concrete examples of the claimed composition its makeup and the ratio between titanium ions and ions of metals from other groups of the pt are given in table 1, where compounds of metals are shown in the form of ions and titanium compounds are evaluated in titanium ions.

Depending on the type of water to be treated different compositions, which include different combinations of these compounds, can be used The most suitable type of the composition for a water source to be treated is chosen on the basis of the classification of natural and waste waters [19, pp. 72-89] and the appropriate data bank [20] in terms of the combination of the above-mentioned elements and the ratio between them and titanium ions The data obtained in the course of applying the claimed composition to real water sources of different types are given in tables 2-8
- purification of water from suspended substances and organic compounds (tables 2-4),
- purification of water from heavy metals (table 5),
- purification of water from organic impurities by introducing reducing metals (table 6),
- purification of water from oil products and arsenic (table 7),
- purification of water from humic acids (table 8)

The above-mentioned technical result of the embodiment of the invention (the second version) is provided by introducing oxides, hydroxides and metal salts and/or their mixtures as metal compounds and solutions of titanium chloride and/or titanium sulfate and/or titanium carbonate and/or titanium phosphate and/or their mixtures as an acid titanium-containing solution into the composition for natural water and waste waters treatment which includes titanium compounds and those of some metals from groups I-IV, VIII of the pt (tables 2-3).

Addition of trivalent titanium compounds by introducing reducing metals or trivalent titanium solutions (the third version) in the composition makes natural and waste waters treatment more effective, especially as far as organic impurities are concerned. This is due to the fact that formation of complexes and the addition of organic molecules to trivalent titanium ions result in their increased adsorption on coagulant flakes (tables 6-7).

The claimed process of preparing the composition for natural and waste waters purification (the first version) includes treating compounds of metals from groups II, III and VIII of the pt with an acid titanium-containing solution with simultaneous stirring and heating. Unlike prior state of the art the claimed process uses as metal compounds not only hydroxides but also oxides and salts of metals from groups II, III, and VIII of pt as well as oxides, hydroxides and salts of metals from groups I, IV and V. Besides that depending on the composition's application solutions of either sulfate or carbonate or phosphate of titanium are chosen as titanium acid solutions (tables 3).

The claimed process (the second version) differs from the prior art because the former implies heating the elements of the mixture at different rates in at least two steps: rapid melting of metal compounds in the first step (the temperature varying in the range of 10° C.-90° C. at the rate of 3° C./min) and slow heating in the second and third steps (in the ranges of 90° C.-150° C. and 105° C.-120° C.) to carry out polymerization of the composition (table 5).

The fact that the process of heating has at least two step and polymerization is used enables one to produce composite material which coagulates well in the water even at low temperatures and forms big flakes. It intensifies the process of treatment and makes it more economical because of both larger capacity of water treatment plants and smaller doses of coagulant.

In its third version the claimed process is also different from the prior art in that an introduction of a solution of trivalent titanium ions at the stage of polymerization (or its synthesis by introducing reducing metals into the composition) improves the quality of a reagent by increasing its ability to adsorb organic compounds (tables 6-7).

The forth version of the claimed process differs from the prior art in that oxides of metals from groups II-V of the pt are introduced into the composition in the final phase of the process. The oxides acting as sorbents and centers of flake formation, which make purification from natural organic impurities more efficient (table 8).

Changing makeup of the composition and combinations of the elements of the composition enables one, by means of the above-mentioned technology of synthesis, to have a wide range of reagents for treating natural and waste waters of various types with different makeup and content of heavy metals, radionuclides, suspended substances, organic compounds, microorganisms, phytoplankton and zooplankton.

Technical result of the embodiment of the invention is the same for all the versions of the claimed process of preparing composition for natural and waste waters treatment. It features optimal makeup of the composition and an opportunity to synthesize the reagent under set technologic conditions, which enables one to get the best results in terms of technology, economy and ecology.

The claimed versions of the process are based on entirely new ideas the claimed invention differs from prior state of the art because it uses a totally different approach to coagulant preparation.

The main methodological principles of the claimed composition and the process of its preparation are based on two points:
- use of coagulation and sorption ability of titanium as the main part of the composition's design,
- introduction of other elements with different sorption ability into the composition depending on the conditions of the water source to be treated.

In water titanium compounds form colloid solutions with complicated spatial structure, which serves as a basis for flakes that form in the course of coagulation process. If tri-, tetra- and pentavalent metal ions are included into the system, coagulation ability of the composition increases and big flakes of the coagulant rapidly precipitate in the course of water sources treatment with the claimed composition. The flakes have extended surfaces with a wide range of active centers of adsorption and micropores.

The number and the activity of these centers in relation to different impurities is increased by introducing elements from other groups of the pt into the composition. The highest degree of purification in relation to the given combination of impurities can be achieved by the selection of the most appropriate elements.

By changing the makeup of the composition one can get flakes with a lot of micropores, which differ in size and adsorption ability. The micropores effectively sorb organic compounds, microorganisms, suspended substances, phytoplankton and zooplankton.

A high content of active adsorption centers and micropores provides effective purification from ionogen and non-ionogen organic compounds, which is one of the principal advantages of the claimed composition in comparison to prior coagulants Introduction of trivalent titanium compounds (either by synthesizing them by means of reducing metals at the final stages of the process or by direct addition) is also aimed at making purification from organic compounds more efficient Trivalent titanium ions and organic impurities can form complexes, which can be easily absorbed by titanium coagulant.

A higher degree of purification is also achieved by additional introduction of some metal oxides which act as centers of flakes formation and sorbents of impurities.

Thus the complex composition on the basis of titanium compounds and those of other elements enables one to purify natural and waste waters of different types much better than prior reagents.

BRIEF DESCRIPTION OF THE TABLES

Further the claimed invention is explained by means of a few concrete examples of its implementation and by accompanying tables (tables 2-8) which show the results of a research carried out in a laboratory and under plant conditions.

EXAMPLE 1

Metals from groups I-V, VIII of the pt in the form of oxides and/or hydroxides and/or salts and/or their mixtures are introduced, under the temperatures of 10° C.-40° C., into 100 ml of an acid water solution of titanium chloride, the ratios of the introduced metals given in table 1.

The solution, which contains, if evaluated in ions, 15% of titanium is continuously stirred and the resulting mixture is first heated up to 90° C.-95° C. at the rate of at least 3° C./min and then up to 95° C.-120° C. at the rate of at most 1° C./min. The mixture is kept under this temperature for at least 30 minutes, cooled down to room temperature and tested. The results of test purification of natural water from suspended substances (the initial concentration is 2.3 mg/l) and organic impurities (the concentration in terms of permanganate oxidizability is 9 mg of O2/l) are given in tables 2-4.

EXAMPLE 2

Metals from groups I-V, VIII of the pt in the form of oxides and/or hydroxides and/or salts and/or their mixtures are introduced, under the temperatures of 10° C.-40° C., into 100 ml of an acid water solution of titanium chloride, the ratios of the introduced metals given in table 1.

The solution, which contains, if evaluated in ions, 15% of titanium is continuously stirred and the resulting mixture is first heated up to 90° C.-95° C. at the rate of at least 3° C./min and then up to 95° C.-120° C. at the rate of at most 1° C./min. The mixture is kept under this temperature for at least 30 minutes, cooled to room temperature and tested. The results of test purification of natural water from suspended substances (the initial concentration is 2 3 mg/l) and organic impurities (the concentration in terms of permanganate oxidizability is 9 mg of O2/l) are given in tables 3-4.

EXAMPLE 3

Metals from groups I-V, VIII of the pt in the form of oxides and/or hydroxides and/or salts and/or their mixtures are introduced, under the temperatures of 10° C.-40° C., into 100 ml of an acid water solution of titanium sulfate, the ratios of the introduced metals given in table 1.

The solution, which contains, if evaluated in ions, 15% of titanium is continuously stirred and the resulting mixture is first heated up to 90° C. at the rate of at least 3° C./min and then up to 90° C.-105° C. or 90° C.-120° C. at the rate of at most 1° C./min. The mixture is kept under this temperature for at least 30 minutes, cooled to room temperature and tested. The results of test purification of natural water from the most harmful heavy metals: cadmium, manganese, copper by means of the composition prepared under different temperatures is given in table 5.

EXAMPLE 4

Metals from groups I-V, VIII of the pt in the form of oxides and/or hydroxides and/or salts and/or their mixtures are introduced, under the temperatures of 10° C.-40° C., into 100 ml of an acid water solution of titanium phosphate, the ratios of the introduced metals given in table 1.

The solution, which contains, if evaluated in ions, 15% of titanium is continuously stirred and the resulting mixture is first heated up to 90° C. at the rate of at least 3° C./min and then up to 90° C.-120° C. at the rate of at most 1° C./min, with a simultaneous introduction of a reducing metal The resulting composition is kept under this temperature for at least 30 minutes, cooled down to room temperature and tested. The results of test purification of natural water from organic substances by the composition with added reducing metals. aluminum, titanium, tin, or zinc are given in table 6.

EXAMPLE 5

Metals from groups I-V, VIII of the pt in the form of oxides and/or hydroxides and/or salts and/or their mixtures are introduced, under the temperatures of 10° C.-40° C., into 100 ml of an acid water solution of titanium carbonate, the ratios of the introduced metals given in table 1

The solution, which contains, if evaluated in ions, 15% of titanium is continuously stirred and the resulting mixture is first heated up to 90° C. at the rate of at least 3° C./min and then up to 90° C.-120 C at the rate of at most 1° C./min, with a simultaneous introduction of a solution of trivalent titanium. The resulting composition is kept under this temperature for at least 30 minutes, cooled to room temperature and tested. The results of test purification of waste waters from organic substances (oil products) and ecotoxicants (arsenic) by the composition with an introduced solution of trivalent titanium are given in table 7

EXAMPLE 6

Metals from groups I-V, VIII of the pt in the form of oxides and/or hydroxides and/or salts and/or their mixtures are introduced, under the temperatures of 10° C.-40° C., into 100 ml of an acid water solution of titanium sulfate, the ratios of the introduced metals given in table 1.

The solution, which contains, if evaluated in ions, 15% of titanium is continuously stirred and the resulting mixture is first heated up to 90° C. at the rate of at least 3° C./min and then up to 90° C.-120° C. at the rate of at most 1° C./min, with a simultaneous introduction of oxides of metals from groups II-IV of the pt The resulting composition is kept under this temperature for at least 30 minutes, cooled to room temperature and tested. The results of test purification of natural water from organic substances (humic acids) with introduced oxides of metals from groups II-IV are given in table 8.

The above mentioned results show that the efficiency of purification is higher than that of the prototype.

If the maximum permissible values of the composition elements are exceeded, it is impossible to provide the above-mentioned properties of the composition to a full extent and to purify water well enough as well as to implement the methods of the composition's preparation.

For example, if the ratio Ti:Me exceeds 1:30, the positive effect of titanium on the properties of the composition reduces, which results in lower degree of water treatment. If the ratio Ti.Me is lower than 1:0.1, the coagulation ability of the composition becomes less effective and there appears a lot of finely-dispersed suspension which does not make the treatment more efficient and blocks up filters of sewage disposal plants.

The fact that the process of synthesis is carried out in at least two temperature ranges with different rates of heating makes it possible, on the one hand, to melt the components of the mixture at the rates which are admissible for the technological conditions and, on the other hand, to carry out the process of the polymerization of the composition under optimal temperature conditions If the temperature exceeds 120° C., the product crystallizes and its properties deteriorate.

If the proportion of reducing metals, trivalent titanium and metal oxides is lower than the claimed one, there is no positive effect and if it is higher it is economically unprofitable because the degree of purification changes insignificantly.

If the versions of the invention are embodied in the range between the appropriate maximum and minimum values, it is possible to prepare a product which provides all the aspects of the efficiency of the composition and to implement the processes of its industrial preparation.

THE BEST METHOD OF CARRYING OUT THE INVENTION

The best method of carrying out the invention is determined by the state of a water source to be treated and the impurities it contains.

The composition's makeup is chosen on the basis of the following:
- compounds of metals from groups I-III of the pt are introduced into the titanium compounds-based composition in the course of purifying water from small amounts of heavy metal ion impurities,
- compounds of metals from groups III-VIII of the pt—in the course of purifying water which is heavily polluted with heavy metals;
- compounds of metals from groups IV-V of the pt—to increase coagulation ability and improve flake formation in the course of purifying water from heavy metals and organic substances especially at low temperature of water;
- the composition's anion part is determined by the alkaline reserve of the water to be purified,
- ions of trivalent titanium are introduced to provide a high degree of water purification from organic impurities;
- metal oxides are introduced when the turbidity of the water to be purified is low.

The choice of the makeup of the composition depends on the required degree of water treatment and economic factors.

The process of preparing the composition of a given makeup according to the best version includes heating the mixture in three temperature ranges (up to 90° C. at the rate of at least 3° C./min, up to 105° C. and up to 120° C. at the rate of at most 1° C./min to be kept under this temperature for at least 30 minutes) and introducing trivalent titanium ions and metal oxides.

The version of the preparation process is chosen depending on the degree of water source purification and on economic factors Thus, the above-mentioned facts prove that if all the necessary requirements of the embodiment of the given invention are met, it is possible to prepare a composition to be used as a coagulant for natural and waste waters purification:
- the composition can provide the claimed degree of natural and waste waters purification
- versions of the preparation process make it possible to synthesize a reagent of the necessary makeup It is proved that the composition, as it is described in the patent independent claims, can be repeatedly prepared under plant conditions by the described means.

The result of the embodiment of a group of inventions is a high degree of removing, without any secondary pollution, various ecotoxicants of natural and technological origin in the course of various water sources purification with ecologically harmless reagent: compositions for water treatment.

The review of the prior art carried out by the claimants has shown that there is no analogous art which is characterized by the complexes of features identical to those of the claimed invention in each of its versions. It proves that the claimed invention, which is embodied in the 3 versions of the composition for natural and waste waters purification and 4 versions of the process of preparing the composition for natural and waste waters purification meets the requirement of <<novelty>>.

The search for prior engineering solutions in the field aimed at identifying the features concurring with the claimed inventive features which distinguish from those of the prototype has shown that said features of the invention do not explicitly follow from the prior art.

The analysis of the prior art performed by the applicants has shown that the influence of essential features of each version of the invention claimed herein on the achievement of the above-indicated engineering result is not known in the art which proves that each version of the invention claimed herein meets the requirement of <<adequacy to the inventive level>>

Besides the essential result achieved herein and besides the advantages of the claimed objects of the group one should also mention the additional merits: ecological safety of the titanium compounds-based composition application

INDUSTRIAL APPLICABILITY

The claimed composition and the process of its preparation can be used under plant conditions in any region of the world They can be implemented on the basis of existing plants which produce pigmentary titanium dioxide by both sulfuric acid and chloride processes or they can be implemented by setting up specialized production plants to prepare titanium compounds-based compositions. The range of the composition brands can be wide enough because it takes into account the properties of concrete water sources of various types: natural water, sewage waters, industrial waters, etc.

This is a multipurpose low-waste process, it does not produce waste waters and discharges of gas cleaning plants are used in the production to prepare initial titanium solutions The process is quite reliable for both simpler and more complicated compositions and under different conditions of its synthesizing.

High economic efficiency of the application of the composition in water treatment (smaller reagent consumption and higher capacity of water treatment plants) makes the product competitive.

The composition and the process of its preparation enable to achieve a complicated and multipurpose task of various water sources purification, the most important features of the invention being the following:

deep purification of natural, industrial and waste waters from various, mostly organic, impurities;

higher economic efficiency of the titanium compounds-based composition in comparison with traditional reagents;

relatively simple implementation of the method in terms of both instrumentation and process;

ecological safety of the preparation of the composition (low-waste production) and of its application to water treatment and waste waters purification Thus, the given information shows that the embodiment of the claimed group of inventions meets the following requirements.

The means that embody the inventions are intended to ensure the safety of man's vital activity and, more specifically, to supply people with high quality drinking water and to protect the environment from being polluted with harmful substances.

For the claimed inventions as they are characterized in the independent claims it is proved that the inventions can be embodied by means of the described solutions or of those which are known prior to the patent application.

For all the versions of the preparation of the composition as they are characterized in the independent claims it is proved that the composition can be repeatedly prepared under plant conditions by means of techniques and operations described above and metal compounds used.

On the basis of their analysis the applicants has come to the conclusion that the claimed invention of the composition for natural and waste waters purification and the process of its preparation meet the requirement of <<industrial applicability>>

The technical result achieved by using the composition for natural and waste waters purification and by the process of its preparation is that high quality drinking water is provided for preserving man's longevity and health and that waste waters can be effectively and reliably purified in order to ensure the ecological safety of the environment and people.

TABLE 1

Titanium ion and metals ions from groups II, III and IV of the periodic table rate

| Group pt | Element (Me) | $TiCl_4$ | $Ti(SO_4)_2$ | $Ti(CO_3)_2$ | $Ti_3(PO_4)_4$ |
|---|---|---|---|---|---|
| I | K | 0.1-10 | 0.1-10 | 0.1-10 | 0.1-10 |
|  | Li | 0.1-1 | 0.1-1 | 0.1-1 | 0.1-1 |
|  | Pb | 0.1-0.5 | 0.1-0.5 | 0.1-0.4 | 0.1-0.3 |
| II | Mg | 0.1-30 | 0.1-30 | 0.1-25 | 0.1-25 |
|  | Ca | 0.1-30 | 0.1-30 | 0.1-25 | 0.1-20 |
|  | Zn | 0.1-5 | 0.1-5 | 0.1-4 | 0.1-4 |
| III | Al | 0.1-30 | 0.1-30 | 0.1-30 | 0.1-25 |
|  | Sc | 0.1-0.3 | 0.1-0.2 | 0.1-0.3 | 0.1-0.2 |
|  | La | 0.1-0.3 | 0.1-0.3 | 0.1-0.3 | 0.1-0.2 |
| IV | Si | 0.1-20 | 0.1-20 | 0.1-20 | 0.1-20 |
|  | Zr | 0.1-20 | 0.1-20 | 0.1-15 | 0.1-15 |
|  | Sn | 0.1-10 | 0.1-10 | 0.1-5 | 0.1-7 |
| V | Nb | 0.1-5 | 0.1-3 | 0.1-0.7 | 0.1-0.7 |
|  | Ta | 0.1-0.3 | 0.10.3 | 0.1-0.3 | 0.1-0.3 |
| VIII | Fe | 0.1-30 | 0.1-30 | 0.1-30 | 0.1-30 |
|  | Ni | 0.1-2 | 0.1-2 | 0.1-3 | 0.1-3 |

TABLE 2

Natural water purification degree from suspended substances

| Sample | Element | Ti:Me rate | Suspended substances concentration in natural water, mg/l | Purification degree, % | Organic compounds concentration in cleaned water, $mgO_2/l$ | Purification degree, % |
|---|---|---|---|---|---|---|
| Prior art | Al | 1:0.6 | 0.12 | 94.8 | 4.5 | 50.0 |
| Prior art | Al | 1:10 | 0.15 | 93 | 4.0 | 55.5 |
| 1 | K | 1:0.1 | 1.15 | 50 | 4.16 | 76.0 |
| 2 | K | 1:5 | 0.15 | 95.5 | 1.89 | 79.0 |
| 3 | K | 1:10 | 0.17 | 95 | 2.07 | 77.0 |
| 4 | Zn | 1:0.1 | 1.1 | 52.2 | 3.8 | 57.8 |
| 5 | Zn | 1:3 | 0.15 | 93 | 1.5 | 03.3 |
| 6 | Zn | 1:5 | 0.40 | 82.6 | 1.2 | 96.7 |
| 7 | Zr | 1:0.1 | 0.9 | 90.8 | 4.1 | 44.4 |
| 8 | Zr | 1:5 | 0.11 | 95.7 | 0.98 | 80.2 |
| 9 | Zr | 1:20 | 0.1 | 95.8 | 0.99 | 89.0 |
| 10 | Nb | 1:0.1 | 1.2 | 47.8 | 4.05 | 55.0 |
| 11 | Nb | 1:2 | 0.11 | 95.0 | 0.88 | 90.3 |
| 12 | Nb | 1:5 | 0.15 | 93.5 | 0.82 | 90.9 |
| 13 | mix: K:Zn. Zr:Nb = 0.5:1. 1:0.5 | 1:5 | 0.09 | 96.1 | 0.72 | 91.2 |

TABLE 3

Natural water purification from suspended substances degree in depending on titanium compound type

| Sample | Titanium compound type | Ti/Me rate | Suspended substances concentration in natural water, mg/l | Suspended substances concentration in cleaned water, mg/l | Purification degree, % |
|---|---|---|---|---|---|
| Prior art | chloride | 1:0.6 | 2.3 | 0.12 | 94.8 |
| Prior art | chloride | 1:10 | 2.3 | 0.15 | 93.0 |
| 1 | chloride | 1:0.1 | 2.3 | 0.14 | 94.0 |
| 2 | chloride | 1:5 | 2.3 | 0.1 | 95.5 |
| 3 | chloride | 1:30 | 2.3 | 0.11 | 95.0 |
| 4 | sulfate | 1:0.2 | 2.3 | 0.11 | 95.0 |
| 5 | sulfate | 1:5 | 2.3 | 0.09 | 96.0 |

TABLE 3-continued

Natural water purification from suspended substances degree in depending on titanium compound type

| Sample | Titanium compound type | Ti/Me rate | Suspended substances concentration in natural water, mg/l | Suspended substances concentration in cleaned water, mg/l | Purification degree, % |
|---|---|---|---|---|---|
| 6 | sulfate | 1:30 | 2.3 | 0.08 | 96.5 |
| 7 | carbonate | 1:0.3 | 2.3 | 0.14 | 94.0 |
| 8 | carbonate | 1:5 | 2.3 | 0.08 | 95.5 |
| 9 | carbonate | 1:30 | 2.3 | 0.11 | 95.0 |
| 10 | phosphate | 1:0.2 | 2.3 | 0.11 | 95.0 |
| 11 | phosphate | 1:5 | 2.3 | 0.09 | 96.0 |
| 12 | phosphate | 1:30 | 2.3 | 0.07 | 97.0 |

TABLE 4

Natural water purification from organic compounds degree.

| Sample | Titanium compound type | Ti:Me rate | Organic compounds concentration in natural water, mgO$_2$/l | Organic compounds concentration in purified water, mgO$_2$/l | Purification degree, % |
|---|---|---|---|---|---|
| Prior art | chloride | 1:0.6 | 9.0 | 4.5 | 50 |
| 1 | chloride | 1:0.1 | 9.0 | 2.16 | 76 |
| 2 | chloride | 1:5 | 9.0 | 1.89 | 79 |
| 3 | chloride | 1:30 | 9.0 | 2.07 | 77 |
| 4 | sulfate | 1:0.2 | 9.0 | 1.98 | 78 |
| 5 | sulfate | 1:5 | 9.0 | 1.8 | 80 |
| 6 | sulfate | 1:30 | 9.0 | 2.25 | 75 |
| 7 | carbonate | 1:0.3 | 9.0 | 2.61 | 71 |
| 8 | carbonate | 1:5 | 9.0 | 2.52 | 72 |
| 9 | carbonate | 1:30 | 9.0 | 2.79 | 69 |
| 10 | phosphate | 1:0.2 | 9.0 | 1.8 | 80 |
| 11 | phosphate | 1:5 | 9.0 | 1.62 | 82 |
| 12 | phosphate | 1:30 | 9.0 | 1.8 | 80 |

TABLE 5

Natural water purification from heavy metals in depending on terms of heating during the process of preparing the composition

| Terms of preparing the composition and purification from heavy metals degree | Prior art | Sample 1 | Sample 2 | Sample 3 |
|---|---|---|---|---|
| Temperature range, ° C. | >60 | 10-90 | 10-105 | 10-120 |
| Heating phase | 1 | 1 | 2 | 2 |
| Temperature range, ° C. The 1st phase | >60 | 10-90 | 10-90 | 10-90 |
| Temperature range, ° C. The 2nd phase | | | 90-105 | 90-120 |
| Cadmium concentration in purifying water, mkg/l | 0.43 | 0.43 | 0.43 | 0.43 |
| Cadmium concentration in purified water, mkg/l | 0.23 | 0.12 | 0.1 | 0.1 |
| Purification degree, % | 42.5 | 72.0 | 97.6 | 97.6 |
| Manganese concentration in purifying water, mkg/l | 540 | 540 | 540 | 540 |
| Manganese concentration in purified water, mkg/l | 210 | 120 | 53 | 55 |
| Purification degree, % | 41.2 | 87.7 | 90.0 | 90.0 |
| Cooper concentration in purifying water, mkg/l | 520 | 550 | 550 | 550 |
| Cooper concentration in purified water, mkg/l | 220 | 10 | 6.9 | 7.1 |
| Purification degree, % | 51.7 | 88.2 | 98.8 | 98.7 |

TABLE 6

Natural water purification degree from organic impurities by the composition with added reducing metals.

| Reducing metal | Addition metal to titanium rate, % | Organic compounds concentration in natural water, mgO$_2$/l | Organic compounds concentration in purified water, mgO$_2$/l | Purification degree, % |
|---|---|---|---|---|
| Prior art | | 8 | 1.6 | 80 |
| Aluminum | 0 | 8 | 1.68 | 79 |
| Aluminum | 1 | 8 | 1.36 | 83 |
| Aluminum | 3 | 8 | 1.12 | 86 |
| Aluminum | 5 | 8 | 1.04 | 87 |
| Titanium | 0 | 8 | 1.68 | 79 |
| Titanium | 1 | 8 | 1.52 | 81 |
| Titanium | 3 | 8 | 1.28 | 84 |
| Titanium | 5 | 8 | 1.12 | 86 |
| Tin | 0 | 8 | 1.68 | 79 |
| Tin | 1 | 8 | 1.2 | 85 |
| Tin | 3 | 8 | 1.12 | 86 |
| Tin | 5 | 8 | 0.96 | 88 |
| Zinc | 0 | 8 | 1.68 | 79 |
| Zinc | 1 | 8 | 1.44 | 82 |
| Zinc | 3 | 8 | 1.2 | 85 |

TABLE 7

Purification of waste waters from organic substances (oil products) and ecotoxicants (arsenic) by the composition with an introduced solution of trivalent titanium

| Sample | Ti (III) to Ti (IV) rate, % | Oil products concentration before purification, mg/l | Oil products concentration after purification, mg/l | Purification degree, % |
|---|---|---|---|---|
| Prior art | 0 | 35 | 10 | 71.5 |
| 1 | 1 | 35 | 4 | 88.3 |
| 2 | 2 | 35 | 0.2 | 99.5 |
| 3 | 3 | 35 | 0.12 | 99.6 |
| 4 | 5 | 35 | 0.1 | 99.7 |

| Sample | Ti (III) to Ti (IV) rate, % | Arsenic concentration before purification, mg/l | Arsenic concentration after purification, mg/l | Purification degree, % |
|---|---|---|---|---|
| Prior art | 0 | 3 | 1.3 | 57 |
| 1 | 1 | 3 | 0.98 | 67.3 |
| 2 | 2 | 3 | 0.63 | 79 |
| 3 | 3 | 3 | 0.022 | 99.3 |
| 4 | 5 | 3 | 0.018 | 99.4 |

TABLE 8

Natural water purification from organic substances (humic acids) with introduced oxides of metals

| Metal oxide type | Metal oxide to titanium rate, % | Colourity of water before purification (organic substances), degree. | Colourity of water after purification, degree | Purification degree, % |
|---|---|---|---|---|
| Prior art | 0 | 65 | 6.5 | 90 |
| Sample 1 (without oxides) | 0 | 30 | 10.5 | 70.0 |
| Calcium oxide | 1 | 30 | 4.9 | 73.7 |
| Calcium oxide | 3 | 30 | 4.5 | 85.0 |
| Calcium oxide | 5 | 30 | 4.5 | 85.0 |
| Aluminum oxide | 1 | 30 | 3.3 | 89.0 |
| Aluminum oxide | 3 | 30 | 3.2 | 89.3 |
| Aluminum oxide | 5 | 30 | 3.1 | 89.6 |
| Titanium dioxide | 1 | 30 | 2.8 | 90.6 |
| Titanium dioxide | 3 | 30 | 2.7 | 91.0 |
| Titanium dioxide | 5 | 30 | 2.5 | 91.7 |

SOURCES

1. Tkachev K. V., Zapolsky A. K., Kisel Yu. K. The Technology of Coagulants. Leningrad, <<Khimiya>>, 1978, pp. 8-32.
2. Zapolsky A. K., Baran A. A. Coagulants and Floculants in Water Treatments processes. Leningrad, <<Khimiya>>, 1987, pp. 10-105.
3. U.S. Pat. No. 4,566,986, class CO2F 005/08; CO1F 007/16; CO1F 007/74. published 28 Jan. 1986
4. U.S. Pat. No. 5,976,401, class CO2F 001/42; CO2F 005/08; CO9K 003/00/
5. Babenkov E. D. The Water Cleaning by Coagulants. Moscow, <<Nauka>>, 1977, p. 108.
6. Japan patent No 8266602A, class A61L 009/01, published 30 Mar. 1995.
7. U.S. Pat. No. 6,123,854, class B01D 021/01, published 26 Sep. 2000 (prior art for the composition).
8. Russian patent No 2.039.711, class CO2F1/52, published 20 Jul. 1995.
9. Russian patent No 93031275 class CO1F 7/52, published 20 Jan. 1996
10. Russian patent No 95106759/25, class CO1F7/74, published 10 Jan. 1997
11. Russian patent No 2.088.527, class CO1F7/74, published 27 Aug. 1997
12. Russian patent No 97119967/25, class CO1F7/25, published 27 Aug. 1997
13. Russian patent No 2.122.975, class CO1F7/74, published 10 Dec. 1998.
14. U.S. Pat. No. 4,156,040, class B05D 003/02, published 22 May 1979
15. U.S. Pat. No. 4,215,094, class CO1F 007/06, COF 007/46, published 29 Jul. 1980.
16. Russian patent No 2.087.425 class CO2F1/52, CO1F7/74, published 20 Aug. 1997 (prior art for method).
17. The WHO Environmental Health Criteria Series. No 24: Titanium. World Health Organization Publications. Geneva. 1982, p. 68 (Russian reprint edition: Moscow <<Medicina>>, 1986).
18. The List of Maximum Permissable Concentration and Jeneral Safety Pressure Level of Harmful Substances for Fishing Reservoirs. Moscow, <<Medinf>>, 1995.
19. Kulsky L. A. The Theoretical Basement of Water Cleaning. Kiev, <<Naukova dumka>>, 1968, pp. 72-89.
20. Frog N. P. The Informational Base for Technological Process of Drinking Water Preparation Choice//Water Supply and Sanitary Technique, 1998, No 4, p. 8
21. Gorostchenko Ya. G. Chemistry of Titanium. Part I, Kiev, <<Naukova dumka>>, 1972, p. 258.

What is claimed is:

1. A process of preparing a composition, for natural and waste waters purification, by heating and stirring an acid titanium-containing solution with compounds of metals selected from the group consisting of Groups I,IV and V of the Periodic Table, wherein the heating is carried out in at least two steps: in the first step it is carried out at the minimum rate of at least 3° C./min at a temperature in the range of 10-90° C., and in the second step the rate is slowed down to 1° C./min and is carried out for 0.5-2 hours at a temperature in the range of 95° C.-105° C., and then the third step is carried out for 0.5-2 hours at a temperature in the range of 105° C.-120° C.

2. A process of preparing a composition, for natural and waste waters purification, by treating metals compounds selected from the group consisting of Groups I-V and VIII of the Periodic Table with an acid titanium-containing solution with continuous stirring and heating, wherein the treatment is carried out by heating in at least two steps: wherein the first step is carried out at the minimum rate of at least 3° C./min at a temperature in the range of 10-90° C., then the rate is slowed down to 1° C./min and the second step is carried out for 0.5-2 hours at a temperature in the range of 95° C.-105° C., and then the third step is carried out for 0.5-2 hours at a temperature in the range of 105° C.-120° C. with a one time injection of trivalent titanium compound.

3. A process of preparing a composition, for natural and waste waters purification, by treating metals compounds selected from the group consisting of Groups I-V and VIII of the Periodic Table with an acid titanium-containing solution with continuous stirring and heating, wherein the treatment is carried out by heating in at least two steps: the first step is carried out at the minimum rate of at least 3° C./min at a temperature in the range of 10-90° C., then the rate is slowed down to 1° C./min, the second step is carried out for 0.5-2 hours at a temperature in the range of 95° C.-105° C., and then the third step is carried out for 0.5-2 hours at a temperature in the range of 105° C.-120° C. with simultaneous synthesis of trivalent titanium compounds by introduction of metal powders selected from the group consisting of aluminum, titanium, zinc, tin, and mixtures thereof as reducing agents.

4. A process of preparing a composition for natural and waste waters purification, by treating metals selected from the group consisting of Groups I-V and VIII of the Periodic Table with an acid titanium-containing solution with continuous stirring and heating, wherein the treatment is carried out by heating in at least two steps: at a temperature in the range of 10-120° C., with introduction of oxides of metals from Groups I-V of the Periodic Table just before the end of the process.

* * * * *